(12) United States Patent
Yang et al.

(10) Patent No.: US 9,854,569 B2
(45) Date of Patent: Dec. 26, 2017

(54) UPLINK CONTROL CHANNEL CONFIGURATION FOR UNLICENSED CARRIERS

(71) Applicant: TELEFONAKTIEBOLAGET LM ERICSSON (PUBL), Stockholm (SE)

(72) Inventors: Yu Yang, Solna (SE); Fredrik Lindqvist, Järfälla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/431,012

(22) Filed: Feb. 13, 2017

(65) Prior Publication Data

US 2017/0164352 A1 Jun. 8, 2017

Related U.S. Application Data

(63) Continuation of application No. PCT/IB2016/057404, filed on Dec. 7, 2016.

(60) Provisional application No. 62/264,091, filed on Dec. 7, 2015.

(51) Int. Cl.
*H04W 72/04* (2009.01)
*H04W 16/14* (2009.01)
*H04L 5/00* (2006.01)

(52) U.S. Cl.
CPC ....... *H04W 72/0413* (2013.01); *H04W 16/14* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 2015/0092702 A1* | 4/2015 | Chen | H04W 72/082 370/329 |
| 2016/0100407 A1* | 4/2016 | Gaal | H04W 72/0453 370/329 |
| 2016/0344526 A1* | 11/2016 | Fan | H04L 5/0048 |
| 2017/0006583 A1* | 1/2017 | Tavildar | H04B 7/2615 |
| 2017/0094680 A1* | 3/2017 | Patel | H04W 72/1284 |
| 2017/0142713 A1* | 5/2017 | Chendamarai Kannan | H04W 72/0446 |

OTHER PUBLICATIONS

Ericsson: 3GPP TSG-RAN WG2 #91bis, Tdoc R2-154740; "Study of shorter TTI for latency reduction"; Malmo, Sweden; Oct. 5-9, 2015.

Huawei, HiSilicon: 3GPP TSG RAN WG1 Meeting #83; R1-156461; "Control signaling enhancements for short TTI"; Anaheim, USA; Nov. 15-22, 2015.

ZTE: 3GPP TSG RAN WG1 Meeting #83; R1-157151; "L1 considerations on latency reduction;" Anaheim, USA; Nov. 15-22, 2015.

\* cited by examiner

*Primary Examiner* — Kodzovi Acolatse

(57) ABSTRACT

A physical uplink control channel (PUCCH) format for transmission of uplink control information (UCI) in unlicensed spectrum is either short PUCCH or long PUCCH. The short PUCCH occupies less than 1 subframe in the time domain and spans an entire system bandwidth in the frequency domain with interlacing on a resource block level. The long PUCCH occupies one subframe in the time domain and spans the entire system bandwidth in the frequency domain with interlacing on a resource block level.

18 Claims, 19 Drawing Sheets

UPLINK CONTROL CHANNEL CONFIGURATION FOR UNLICENSED CARRIERS

CROSS-REFERENCE TO RELATED APPLICATIONS

This application is a continuation of International Application No. PCT/IB2016/057404, filed Dec. 7, 2016, which designates the U.S and which claims priority to U.S. Provisional Application No. 62/264,091, filed on Dec. 7, 2015, the disclosures of which are hereby incorporated by reference in their entirety.

TECHNICAL FIELD

The disclosed subject matter relates generally to telecommunications. Certain embodiments relate more particularly to uplink control channel configuration for unlicensed carriers.

BACKGROUND

The standalone Long-Term Evolution (LTE) in unlicensed spectrum (LTE-U) forum and $3^{rd}$ Generation Partnership Project (3GPP) Release 14 (Rel-14) work item on Uplink Licensed-Assisted Access (LAA) intends to allow LTE User Equipments (UEs) to transmit on the uplink in the unlicensed 5 GHz or license-shared 3.5 GHz radio spectrum. For standalone LTE-U, initial random access and subsequent UL transmissions take place entirely on unlicensed spectrum. Regulatory requirements may prohibit transmissions in the unlicensed spectrum without prior channel sensing.

Because the unlicensed spectrum is typically shared with other radios of similar or dissimilar wireless technologies, a so-called listen-before-talk (LBT) method may be applied. LBT involves sensing the medium for a pre-defined minimum amount of time and backing off if the channel is busy.

Today, unlicensed 5 GHz spectrum is mainly used by equipment implementing the IEEE 802.11 Wireless Local Area Network (WLAN) standard, also known as Wi-Fi.

LTE uses Orthogonal Frequency Division Multiplexing (OFDM) in the downlink and Discrete Fourier Transform spread (DFT-spread) OFDM (also referred to as single-carrier FDMA [SC-FDMA]) in the uplink. The basic LTE downlink physical resource can thus be seen as a time-frequency grid as illustrated in Figure (FIG. 1, where each resource element corresponds to one OFDM subcarrier during one OFDM symbol interval. The uplink subframe has the same subcarrier spacing (15 kHz) as the downlink and the same number of SC-FDMA symbols in the time domain as OFDM symbols in the downlink.

In the time domain, LTE downlink transmissions are organized into radio frames of 10 ms, each radio frame comprising ten equally-sized subframes of length $T_{subframe}=1$ ms as shown in FIG. 2. Each subframe comprises two slots of duration 0.5 ms each, and the slot numbering within a frame ranges from 0 to 19. For normal cyclic prefix, one subframe comprises 14 OFDM symbols. The duration of each symbol is approximately 71.4 µs when including the cyclic prefix.

Furthermore, the resource allocation in LTE is typically described in terms of resource blocks, where a resource block corresponds to 12 contiguous subcarriers in the frequency domain. Resource blocks are numbered in the frequency domain, starting from 0 at one end of the system bandwidth.

Up to now, the spectrum used by LTE is dedicated to LTE. This has the benefit of allowing LTE to avoid complications from sharing the spectrum and to achieve commensurate gains in spectrum efficiency. However, the spectrum allocated to LTE is limited and cannot meet the ever increasing demand for larger throughput from applications/services. Consequently, a new study item has been initiated in 3GPP on extending LTE to exploit unlicensed spectrum in addition to licensed spectrum.

Unlicensed spectrum can, by definition, be simultaneously used/shared by multiple different technologies. Therefore, LTE should consider coexistence with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize unlicensed spectrum reliably is to transmit essential control signals and channels on a licensed carrier. For example, as shown in FIG. 3, a UE is connected to a PCell in the licensed band and one or more SCells in the unlicensed band. In this description, a secondary cell in unlicensed spectrum is referred to as a licensed-assisted access secondary cell (LAA SCell).

A new industry forum has been initiated on extending LTE to operate entirely on unlicensed spectrum in a standalone mode, which is referred to as "MuLTEfire". In MuLTEfire there is no licensed carrier for essential control signals transmissions and control channels. Accordingly, all transmission occurs on unlicensed spectrum with no guaranteed channel access availability, yet it must also fulfill the regulatory requirements on the unlicensed spectrum.

SUMMARY

In some embodiments of the disclosed subject matter, a method of operating a wireless communication device comprises identifying a physical uplink control channel (PUCCH) format for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level, and transmitting the UCI to a radio access node in accordance with the identified PUCCH format.

In certain related embodiments, the UCI is transmitted to the radio access node in coordination with one or more other wireless communication devices. In some such embodiments, transmitting the UCI to the radio access node in coordination with the one or more other wireless communication devices comprises multiplexing the one or more other wireless communication devices on the same interlace as the short PUCCH or the long PUCCH. In some such embodiments, transmitting the UCI in coordination with the one or more other wireless communication devices comprises multiplexing with the one or more other wireless communication devices using orthogonal cover codes (OCC) and cyclic shifts (CS) on control-data symbols and reference symbols, respectively, in the short PUCCH or long PUCCH.

In certain related embodiments, the PUCCH format is short PUCCH.

In certain related embodiments, the PUCCH format is long PUCCH. In some such embodiments, the short PUCCH comprises at least one demodulation reference signal (DMRS) symbol and at least one control-data symbol in the time domain. In some such embodiments, the short PUCCH comprises a sequence of symbols at the end of a downlink partial subframe.

In certain related embodiments, the transmitting comprises transmitting a demodulation reference signal (DMRS) symbol on all subcarriers within a block-interleaved frequency division multiple access (B-IFDMA) symbol on an assigned interlace or on all assigned interlaces across the entire system bandwidth.

In certain related embodiments, the transmitting comprises transmitting a demodulation reference signal (DMRS) symbol once per "n" subcarriers with a pattern that can be shifted or unshifted on different B-IFDMA symbols, where "n" is an integer greater than 1.

In certain related embodiments, the wireless communication device and the one or more other wireless communication devices are assigned different interlacing patterns.

In certain related embodiments, the wireless communication device and the one or more other wireless communication devices are assigned the same interlacing pattern, and they apply different orthogonal cover codes (OCC) to enable PUCCH control-data on the same time-frequency resources.

In some embodiments of the disclosed subject matter, a wireless communication device comprises at least one processor configured to identify a physical uplink control channel (PUCCH) format for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level, and at least one transmitter configured to transmit the UCI to a radio access node in accordance with the identified PUCCH format.

In certain related embodiments, the UCI is transmitted to the radio access node in coordination with one or more other wireless communication devices.

In certain related embodiments, transmitting the UCI to the radio access node in coordination with the one or more other wireless communication devices comprises multiplexing the one or more other wireless communication devices on the same interlace as the short PUCCH or the long PUCCH.

In certain related embodiments, the PUCCH format is short PUCCH.

In certain related embodiments, the PUCCH format is long PUCCH.

In certain related embodiments, the short PUCCH comprises at least one demodulation reference signal (DMRS) symbol and at least one control-data symbol in the time domain.

In certain related embodiments, the short PUCCH comprises a sequence of symbols at the end of a downlink partial subframe.

In certain related embodiments, transmitting the UCI in coordination with the one or more other wireless communication devices comprises multiplexing with the one or more other wireless communication devices using orthogonal cover codes (OCC) and cyclic shifts (CS) on data symbols and reference symbols, respectively, in the short PUCCH or long PUCCH.

In certain related embodiments, the transmitting comprises transmitting a demodulation reference signal (DMRS) symbol on all subcarriers within a block-interleaved frequency division multiple access (B-IFDMA) symbol on an assigned interlace or on all assigned interlaces across the entire system bandwidth.

In certain related embodiments, the transmitting comprises transmitting a demodulation reference signal (DMRS) symbol once per "n" subcarriers with a pattern that can be shifted or unshifted on different B-IFDMA symbols, where "n" is an integer greater than 1.

In certain related embodiments, the wireless communication device and the one or more other wireless communication devices are assigned different interlacing patterns.

In certain related embodiments, the wireless communication device and the one or more other wireless communication devices are assigned the same interlacing pattern, and they apply different orthogonal cover codes (OCC) to enable PUCCH control-data on the same time-frequency resources.

In some embodiments of the disclosed subject matter, a method of operating a radio access node comprises identifying a physical uplink control channel (PUCCH) format to be used by at least one wireless communication device for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level, and receiving the UCI from the at least one wireless communication device in accordance with the identified PUCCH format.

In certain related embodiments, identifying the PUCCH format comprises selecting between short PUCCH and long PUCCH according to at least one of an eNodeB timing configuration and a hybrid automatic repeat request (HARM) protocol.

In certain related embodiments, the received UCI is multiplexed on the same interlace as the short PUCCH or the long PUCCH with information transmitted from at least one other wireless communication device.

In certain related embodiments, the PUCCH format is short PUCCH.

In certain related embodiments, the PUCCH format is long PUCCH.

In certain related embodiments, the short PUCCH comprises at least one demodulation reference signal (DMRS) symbol and at least one control-data symbol in the time domain.

In certain related embodiments, the short PUCCH comprises a sequence of symbols at the end of a downlink partial subframe.

In certain related embodiments, the received UCI is multiplexed in the short PUCCH or long PUCCH with information transmitted from at least one other wireless communication device.

In certain related embodiments, the UCI and the information transmitted from the at least one other wireless communication device are multiplexed using orthogonal cover codes (OCC) and cyclic shifts (CS) on control-data symbols and reference symbols, respectively.

In certain related embodiments, the PUCCH format comprises a demodulation reference signal (DMRS) symbol on all subcarriers within a block-interleaved frequency division multiple access (B-IFDMA) symbol on an assigned interlace or on all assigned interlaces across the entire system bandwidth.

In certain related embodiments, the PUCCH format comprises a demodulation reference signal (DMRS) symbol once per "n" subcarriers with a pattern that can be shifted or unshifted on different B-IFDMA symbols, where "n" is an integer greater than 1.

In certain related embodiments, the UCI is multiplexed with UCI from at least one other wireless communication device using different interlacing patterns within the same subframe.

In certain related embodiments, the UCI is multiplexed with UCI from at least one other wireless communication device using the same interlacing pattern within the same subframe.

In certain related embodiments, the UCI from the at least one wireless communication device and the at least one other wireless communication device are subject to different orthogonal cover codes (OCC).

In some embodiments of the disclosed subject matter, a radio access node comprises at least one processor and memory collectively configured to identify a physical uplink control channel (PUCCH) format to be used by at least one wireless communication device for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level, and a receiver configured to receive the UCI from the at least one wireless communication device in accordance with the identified PUCCH format.

In certain related embodiments, identifying the PUCCH format comprises selecting between short PUCCH and long PUCCH according to at least one of an eNodeB timing configuration and a hybrid automatic repeat request (HARM) protocol.

In certain related embodiments, the received UCI is multiplexed on the same interlace as the short PUCCH or the long PUCCH with information transmitted from at least one other wireless communication device.

In certain related embodiments, the PUCCH format is short PUCCH.

In certain related embodiments, the PUCCH format is long PUCCH.

In certain related embodiments, the short PUCCH comprises at least one demodulation reference signal (DMRS) symbol and at least one control-data symbol in the time domain.

In certain related embodiments, the short PUCCH comprises a sequence of symbols at the end of a downlink partial subframe.

In certain related embodiments, the received UCI is multiplexed in the short PUCCH or long PUCCH with information transmitted from at least one other wireless communication device.

In certain related embodiments, the UCI and the information transmitted from the at least one other wireless communication device are multiplexed using orthogonal cover codes (OCC) and cyclic shifts (CS) on control-data symbols and reference symbols, respectively.

In certain related embodiments, the PUCCH format comprises a demodulation reference signal (DMRS) symbol on all subcarriers within a block-interleaved frequency division multiple access (B-IFDMA) symbol on an assigned interlace or on all assigned interlaces across the entire system bandwidth.

In certain related embodiments, the PUCCH format comprises a demodulation reference signal (DMRS) symbol once per "n" subcarriers with a pattern that can be shifted or unshifted on different B-IFDMA symbols, where "n" is an integer greater than 1.

In certain related embodiments, the UCI is multiplexed with UCI from at least one other wireless communication device using different interlacing patterns within the same subframe.

In certain related embodiments, the UCI is multiplexed with UCI from at least one other wireless communication device using the same interlacing pattern within the same subframe.

In certain related embodiments, the UCI from the at least one wireless communication device and the at least one other wireless communication device are subject to different orthogonal cover codes (OCC).

In some embodiments of the disclosed subject matter, a wireless communication device comprises an identification module configured to identify a physical uplink control channel (PUCCH) format for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level, and a transmission module configured to transmit the UCI to a radio access node in accordance with the identified PUCCH format.

In some embodiments of the disclosed subject matter a radio access node comprises an identification module configured to identify a physical uplink control channel (PUCCH) format to be used by at least one wireless communication device for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level, and a reception module configured to receive the UCI from the at least one wireless communication device in accordance with the identified PUCCH format.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
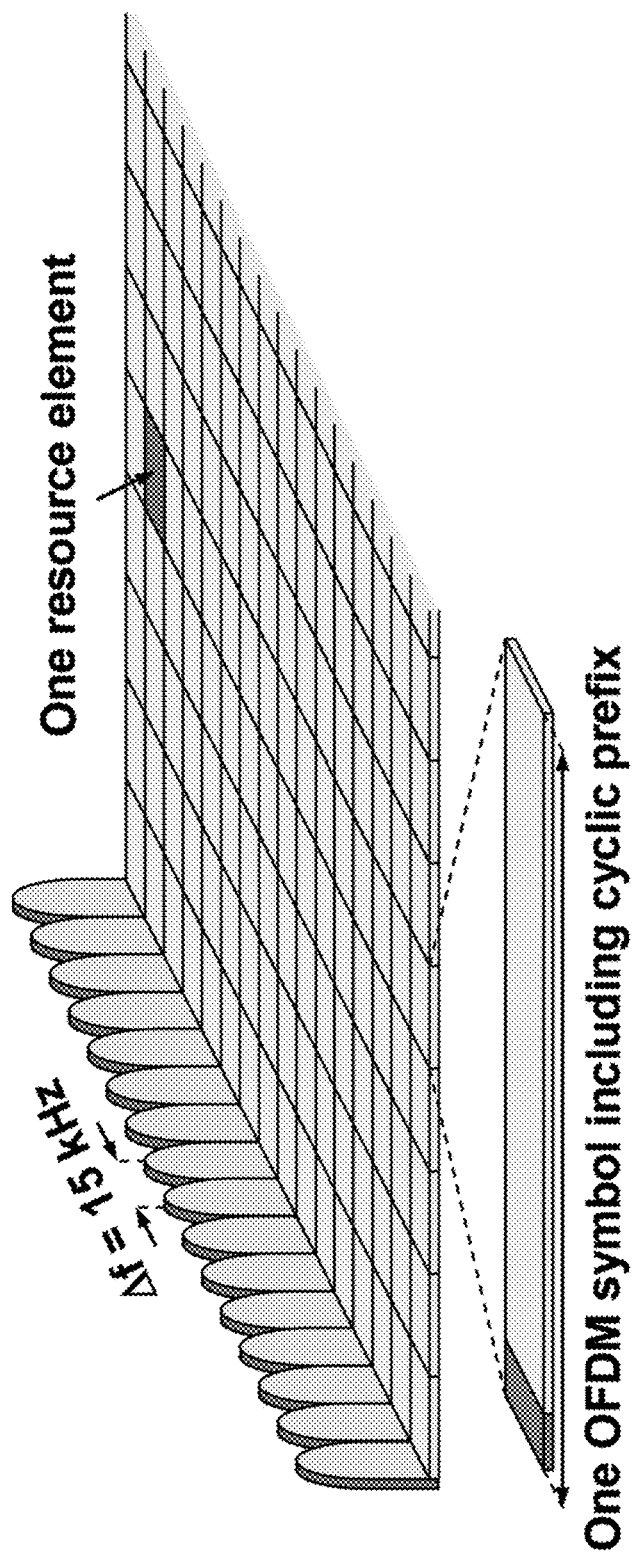
FIG. 1 shows an example LTE downlink physical resource.
Figure 2:
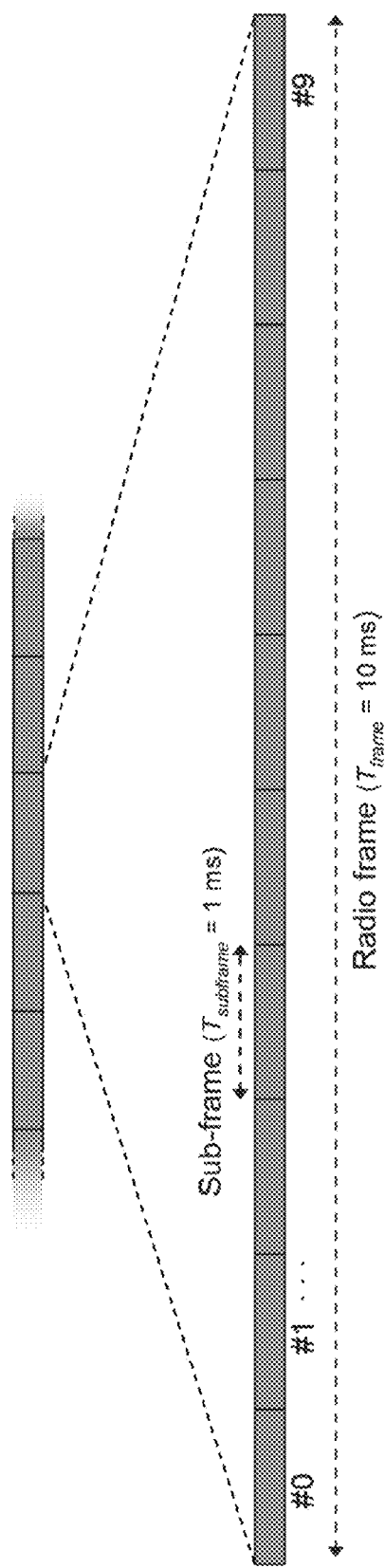
FIG. 2 shows an example LTE time-domain structure.
Figure 3:
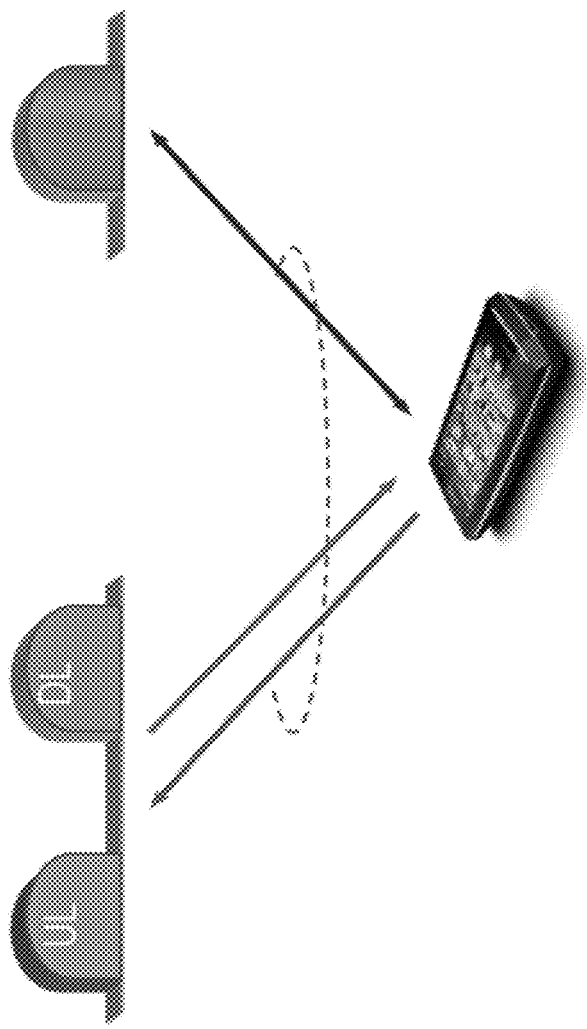
FIG. 3 shows an example of LAA to unlicensed spectrum using LTE carrier aggregation.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In LAA/standalone LTE-U, uplink control information (UCI) such as HARQ-ACK, CSI are sent from UE to eNB on the control channel PUCCH when there is no UL-SCH data scheduled. The PUCCH design up to Rel-13 is only for carriers in licensed spectrum, which is not possible to be reused for carriers in unlicensed spectrum due to regulatory requirements. In addition, because there is no longer any guaranteed channel access availability for PUCCH, special consideration should be given when designing the PUCCH on carriers in unlicensed spectrum.

Certain embodiments of the disclosed subject matter provide a physical layer design of uplink control channel (e.g., PUCCH) format for LAA/standalone LTE-U. Various alternative embodiments may employ either or both of two PUCCH formats, including a short PUCCH and a long PUCCH. The two different PUCCH formats can be considered for UCI transmission depending on e.g. eNB timing configuration and/or HARQ protocol. Although several of the described embodiments relate to PUCCH, the described concepts could nevertheless be applied to other types of uplink control channels.

The short PUCCH typically occupies less than one subframe (e.g. 1-4 SC-FDMA/OFDM symbols) in the time domain, while the long PUCCH typically occupies 1 subframe. Both formats span the entire bandwidth with interlacing. UE multiplexing is supported on both formats using Orthogonal Cover Codes (OCC) and Cyclic Shifts (CS) on data symbols and reference symbols. The normal PUCCH can also be multiplexed with PUSCH transmission from same or different UEs.

In certain embodiments, the establishment and/or use of a particular PUCCH format may be coordinated by one or more radio access nodes. Such coordination may include, for instance, determining the format and signaling scheduling and/or format information from the one or more radio access nodes to one or more wireless communication devices. The determining of the format may include e.g. selecting a PUCCH format according to an eNB timing configuration or a HARQ protocol. The signaling may take the form of e.g. downlink control signaling or radio resource control (RRC) configuration signaling.

The described embodiments may provide various potential benefits compared to conventional approaches. Some embodiments may, for instance, allow UCI to be transmitted on PUCCH on carriers in unlicensed spectrum; some embodiments may allow similar functionality as legacy LTE PUCCH to be maintained; and some embodiments may allow UE multiplexing to be supported on new PUCCH formats.

The following embodiments include physical layer configuration of PUCCH in unlicensed spectrum. Certain methods or concepts described below may be used for both single- and multi-carrier transmissions. The proposed approaches may also apply to different variations of LTE operating in unlicensed spectrum, such as LAA, LTE-U and standalone LTE-U.

In the following description, the term "short PUCCH" refers to a PUCCH that is relatively short in the time domain, e.g., less than 1 subframe. For example, a short PUCCH may occupy 1-4 SC-FDMA or OFDM symbols depending on eNB configuration. In the frequency domain, a short PUCCH may span the whole bandwidth by interlacing. Similarly, the term "long PUCCH" refers to a PUCCH that is relatively long in the time domain, e.g., 1 subframe. In the frequency domain, a long PUCCH may span the whole bandwidth by interlacing.

Figure 7:
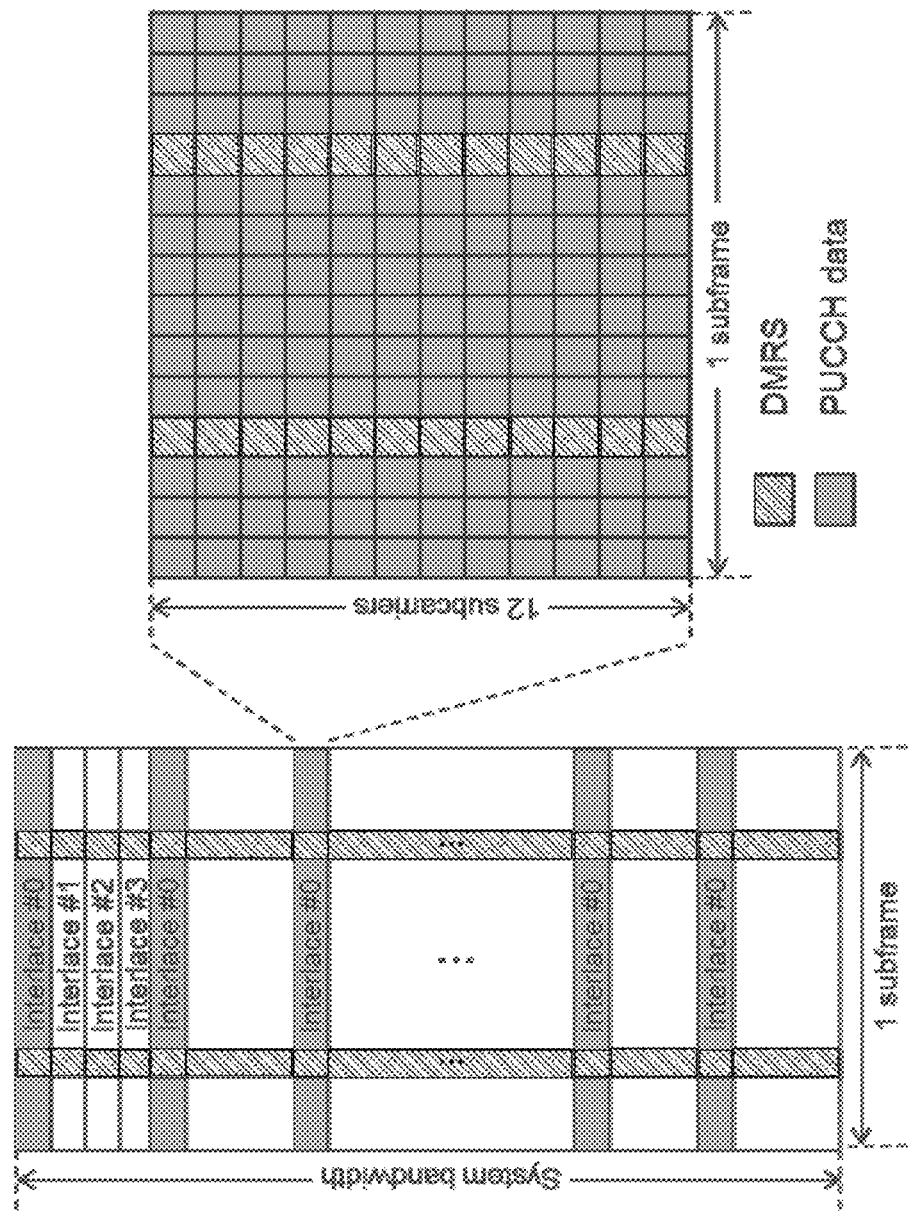
FIG. 7 shows an example of a long PUCCH.

A short PUCCH or long PUCCH is considered to span the whole bandwidth by interlacing if the interlaces of the short PUCCH or long PUCCH are included in an interlacing pattern that spans the entire bandwidth, as illustrated e.g. in FIG. 7. Terms such as "whole bandwidth", "entire bandwidth", "entire system bandwidth", and so on, generally refer to the transmission bandwidth of a carrier. For instance, such terms may refer to the transmission bandwidth of a 10M Hz or 20 MHz carrier, which may be slightly less than 10 MHz or 20 MHz, respectively.

Figure 4:
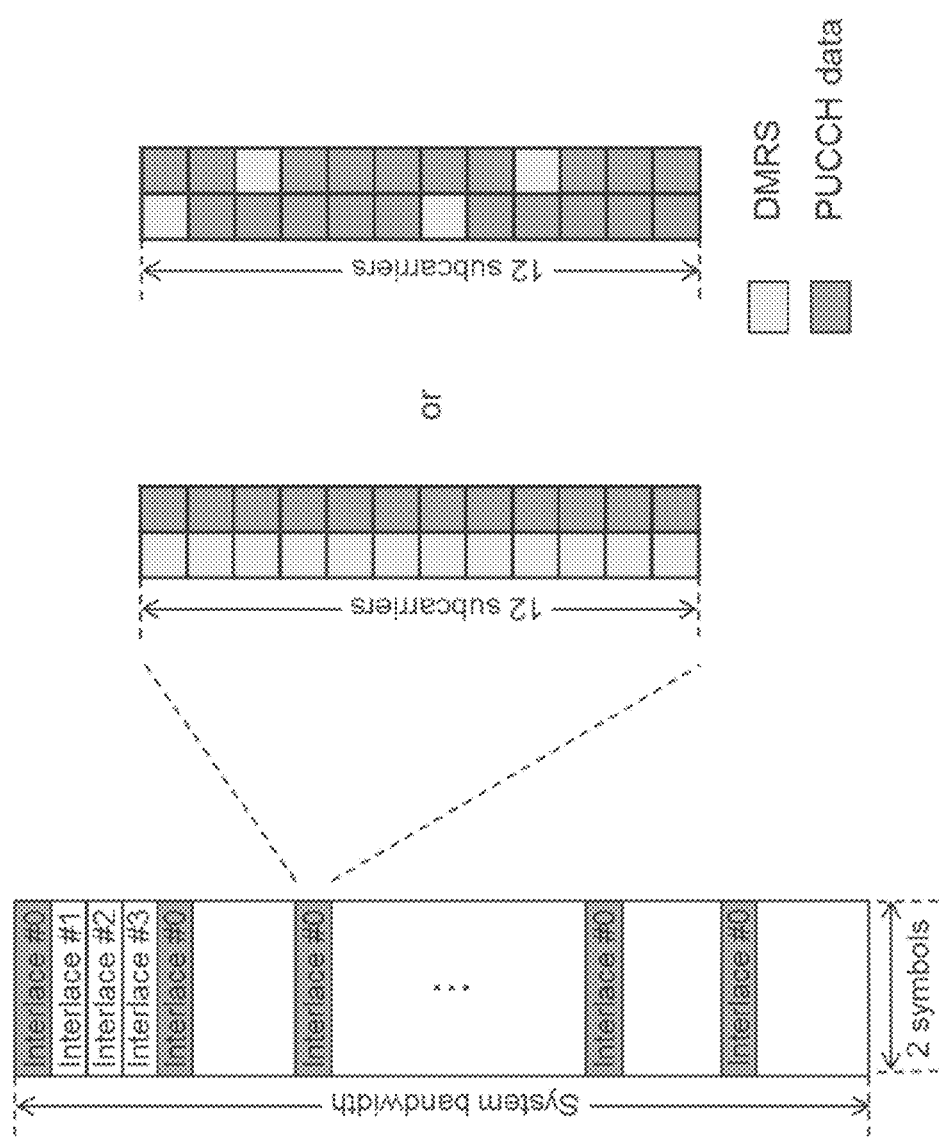
FIG. 4 shows an example of short PUCCH occupying two symbols and one interlace.
Figure 18:
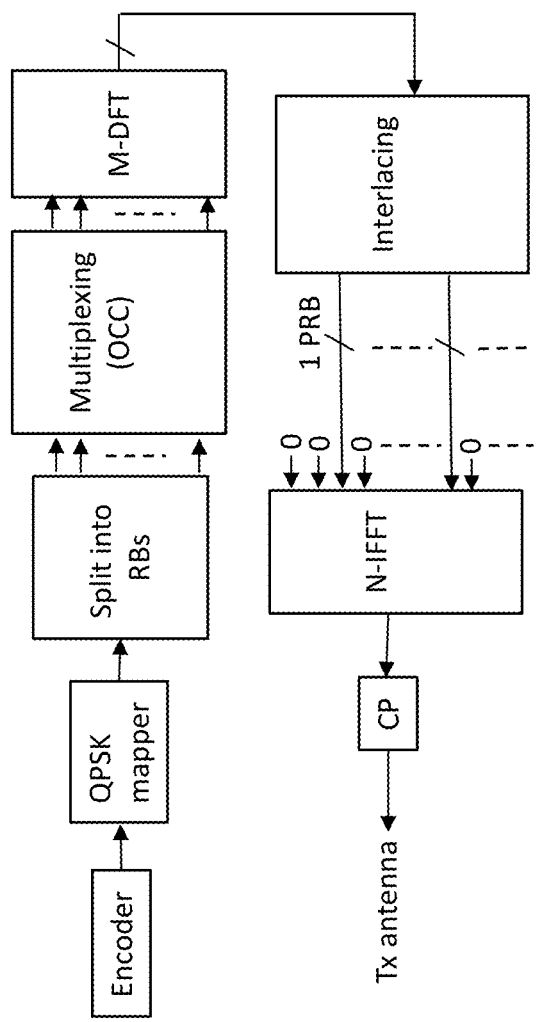
FIG. 18 shows an example of B-IFDMA.

The term "interlacing" refers to a technique in which physical resources are assigned or allocated according to a pattern such as one of those illustrated in FIGS. 4-5 and 7-10, for instance. The term "interlace" refers to a set of physical resources that forms part of an interlacing pattern, with an example interlace being two symbols of a resource block as shown in FIG. 4 or two resource blocks as shown in FIG. 7. In general, interlacing is considered to be performed at a resource block level if an interlace spans a set of subcarriers that corresponds to the size of a resource block in the frequency domain. For instance, FIGS. 4 and 7 both show examples of interlacing at a resource block level. In contrast, interlacing is considered to be performed at a subcarrier level if an interlace only spans a subcarrier in the frequency domain. In the context of LTE and related systems, interlacing at a resource block level can also be referred to as block-interleaved frequency division multiple access (B-IFDMA), with which an inverse Fourier transform (IFFT) of the illustrated PUCCH physical resources with zero values in between, create a time domain waveform being referred to as a B-IFDMA symbol. The size of the mentioned IFFT (in the transmitter) typically corresponds to the system bandwidth. An example of B-IFDMA is shown in FIG. 18, which is a simplified block diagram of an B-IF- DMA transmitter for short/long PUCCH, where for example M=120 and N=2048 with a 20 MHz system bandwidth when using 1 interlace of 10 RBs. In the example of FIG. 18, a third interlace is assigned out of 10 possible.

FIG. 4 shows an example of short PUCCH occupying two symbols in the time domain and one interlace in the frequency domain. In one example, demodulation reference signal (DMRS) is sent on all subcarriers within a B-IFDMA symbol on the assigned interlace(s) or on all interlaces across the whole bandwidth, e.g. across the whole maximum transmission bandwidth or system bandwidth. In another example, DMRS is sent on every few number of subcarriers, e.g., 6 subcarriers (e.g. to enable more PUCCH data) whose pattern can be shifted or unshifted on different B-IFDMA symbols, as illustrated in the right-most part of FIG. 4.

Figure 5:
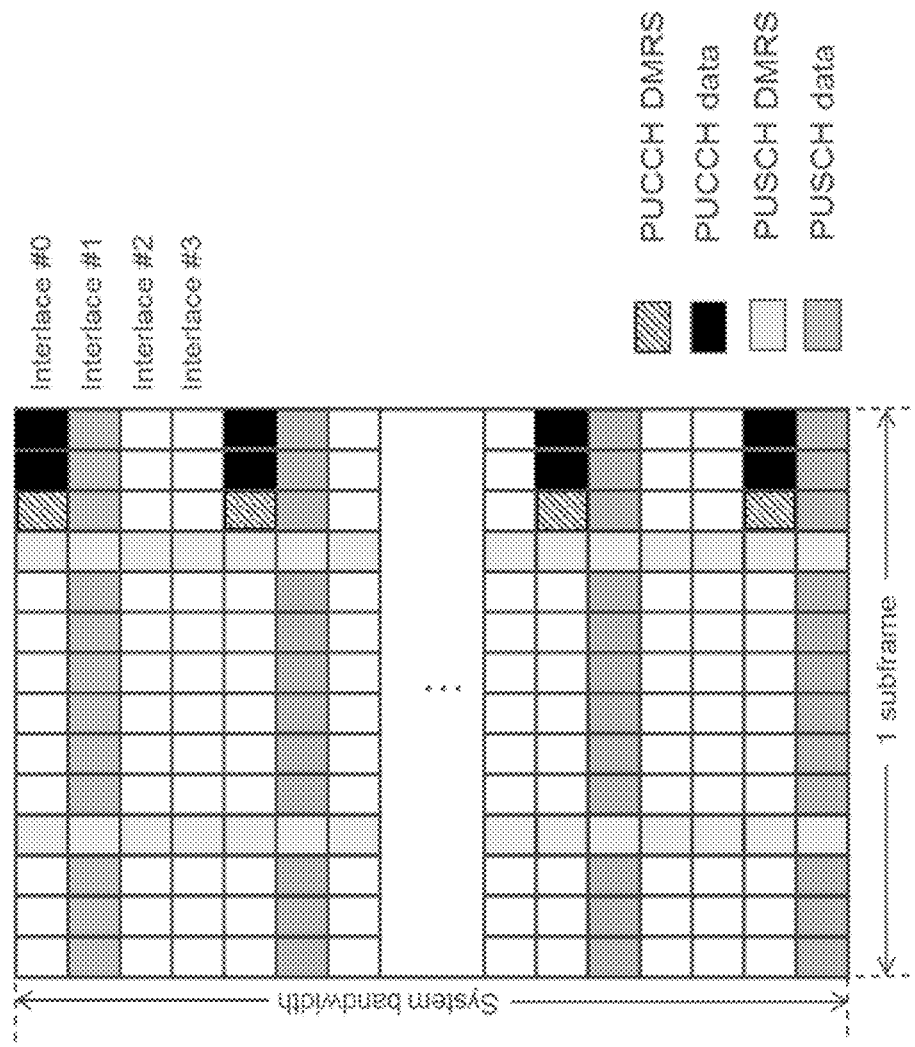
FIG. 5 shows an example of short PUCCH multiplexing with PUSCH transmission in the same subframe.

Multiple PUCCH UEs can be multiplexed on a PUCCH resource by various alternative approaches as explained below. PUCCH UEs can also be multiplexed with PUSCH UEs in the same subframe in a way that PUSCH transmission for other UEs occupying other interlacing patterns as shown in FIG. 5.

For PUCCH multiplexing, in one example PUCCH UEs are assigned different interlacing patterns, i.e., frequency division multiplexing.

Figure 19:
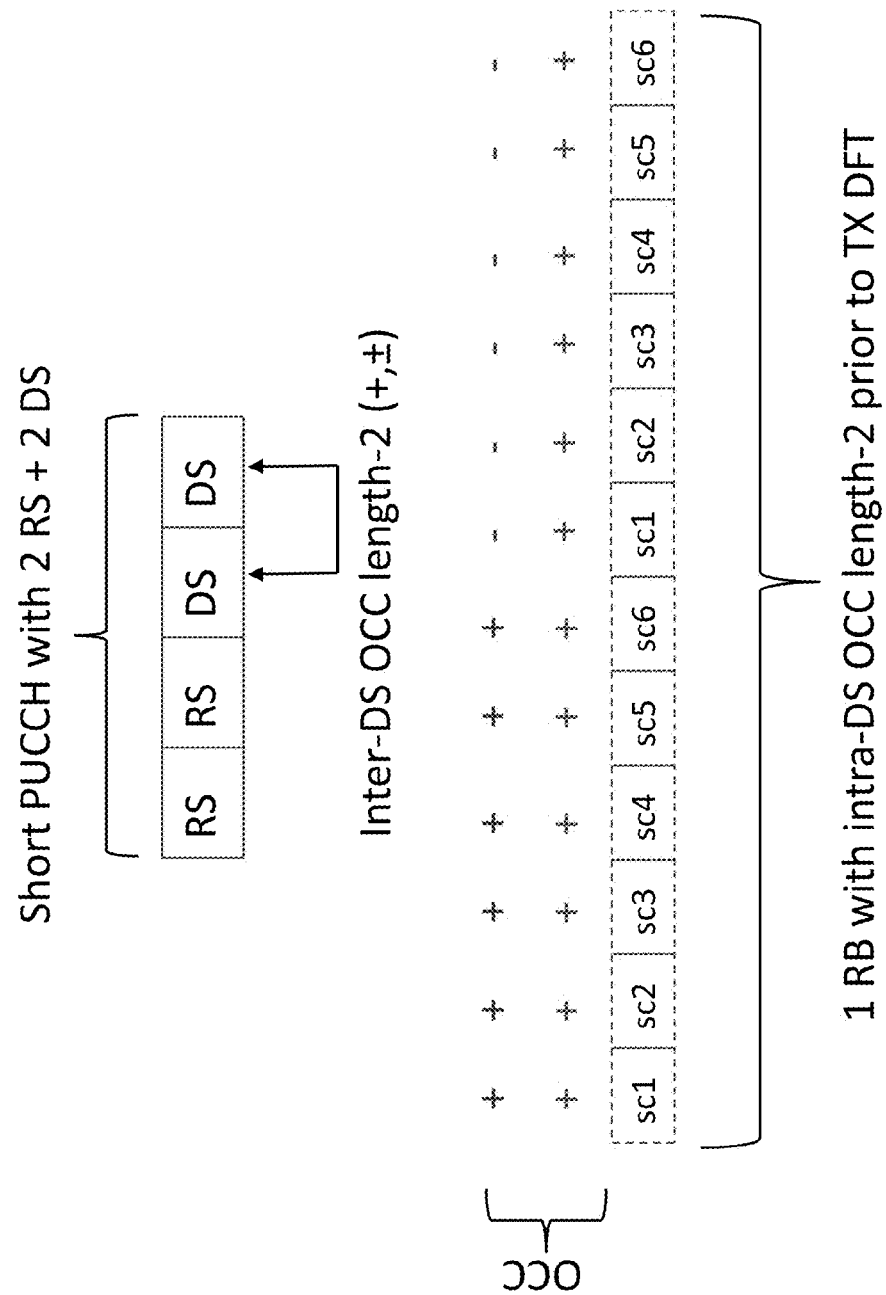
FIG. 19 shows an example of inter- and intra-symbol OCC.

In another example, multiple PUCCH UEs are assigned the same interlacing pattern, in which case UEs apply different Orthogonal Cover Codes (OCC) to enable multiplexing of PUCCH data on the same time-frequency resources. In this context, the OCCs can be employed in two different ways, or in a combination of both, i.e., via inter-symbol OCC or and/or via intra-symbol OCC. FIG. 19 shows examples of inter-DS OCC length-2 (top of FIG. 19) and intra-DS OCC length-2 (bottom of FIG. 19) with bipolar Hadamard OCC.

Figure 6:
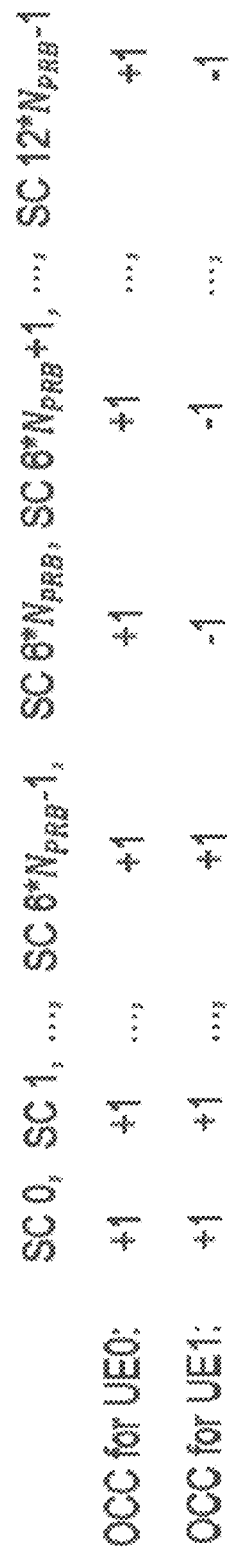
FIG. 6 shows an example of two PUCCH UEs DS multiplexing on the same interlace(s) with $N_{PRB}$ PRBs.

FIG. 6 shows an example of two PUCCH UEs DS multiplexing on the same interlace(s) with $N_{PRB}$ PRBs. In this example, with OFDM modulation, OCC spreading is applied within a symbol in the frequency domain for the total number of allocated subcarriers (SC). In case of B-IFDMA modulation, the OCC spreading within a symbol is similar to FIG. 6 but instead typically applied per physical resource block (PRB) and furthermore before the transmitter DFT. This latter case of intra-symbol OCC corresponds to OCC on a per PRB-basis by essentially assuming $N_{PRB}=1$ in FIG. 6 for each PRB within the allocated interlace(s).

It should be emphasized that FIG. 6 exemplifies the case where 2 UEs are multiplexed. For B-IFDMA and intra-symbol OCC on a PRB-basis, the 2 UE multiplexing case corresponds to that each UE applies an OCC-length of 2 (i.e., 2 repeated symbols). An extension to multiplexing e.g. 4 or 6 UEs with B-IFDMA using intra-symbol OCC on a PRB-basis follows directly by instead applying an OCC of length-4 or length-6 (i.e., repeating 4 or 6 subcarriers within each PRB). The OCC sequences can for example be based on a Hadamard matrix with +1, −1 as in FIG. 6 or based on the columns/rows of an orthogonal matrix such as the DFT matrix. The latter may be preferred with e.g. 4 or 6 intra-symbol OCC multiplexed UEs. As another example, OCC spreading is applied between B-IFDMA symbols which contain data symbols (DS). In the latter case, the OCC can be applied after the transmitter modulation, i.e., in the time domain. Equivalently, the inter-symbol OCC can be applied in the frequency domain or before the transmitter DFT, since it corresponds to scalar multiplication. The reference symbols (RS or so called DMRS) are using existing DMRS sequences in LTE uplink based on Zadoff-Chu sequence (assuming >2 PRBs, for fewer PRBs other sequences are used). Multiple UEs are typically using the same root sequence and transmit RS on the same time-frequency resources. For RS multiplexing, different cyclic shifts are applied for different UEs.

The HARQ feedback and the corresponding process IDs could either be listed explicitly or e.g. be provided as a bitmap (one or two bits per process). To align the design with 3GPP Rel-13 CA, the UCI on short PUCCH (sPUCCH) is attached with an 8-bit CRC and encoded using Tail Biting Convolutional Code (TBCC) for medium to large payload size, e.g., >16-20 bits payload. For shorter payloads, e.g. <16-20 bits, a block code may be used without CRC to improve the performance, for instance, a Reed-Muller code as utilized by LTE. Other encoding types could also be used. The encoded symbols are mapped to available resource elements (Res), e.g., in a frequency first time second manner. Similar features may also be used in relation to long PUCCH.

FIG. 7 shows an example of a long PUCCH, where the PUCCH occupies one interlace in one subframe with two DMRS symbols per subframe. Other number of DMRS per subframe could also be used, e.g. 4 symbols per subframe as in LTE PUCCH format 3. In general, long PUCCH occupies 1 subframe in the time domain, and it spans the whole bandwidth by interlacing in the frequency domain. Demodulation reference signal (DMRS) is sent on all subcarriers within a B-IFDMA symbol on the assigned interlace(s) or on all interlaces across the whole bandwidth.

Figure 8:
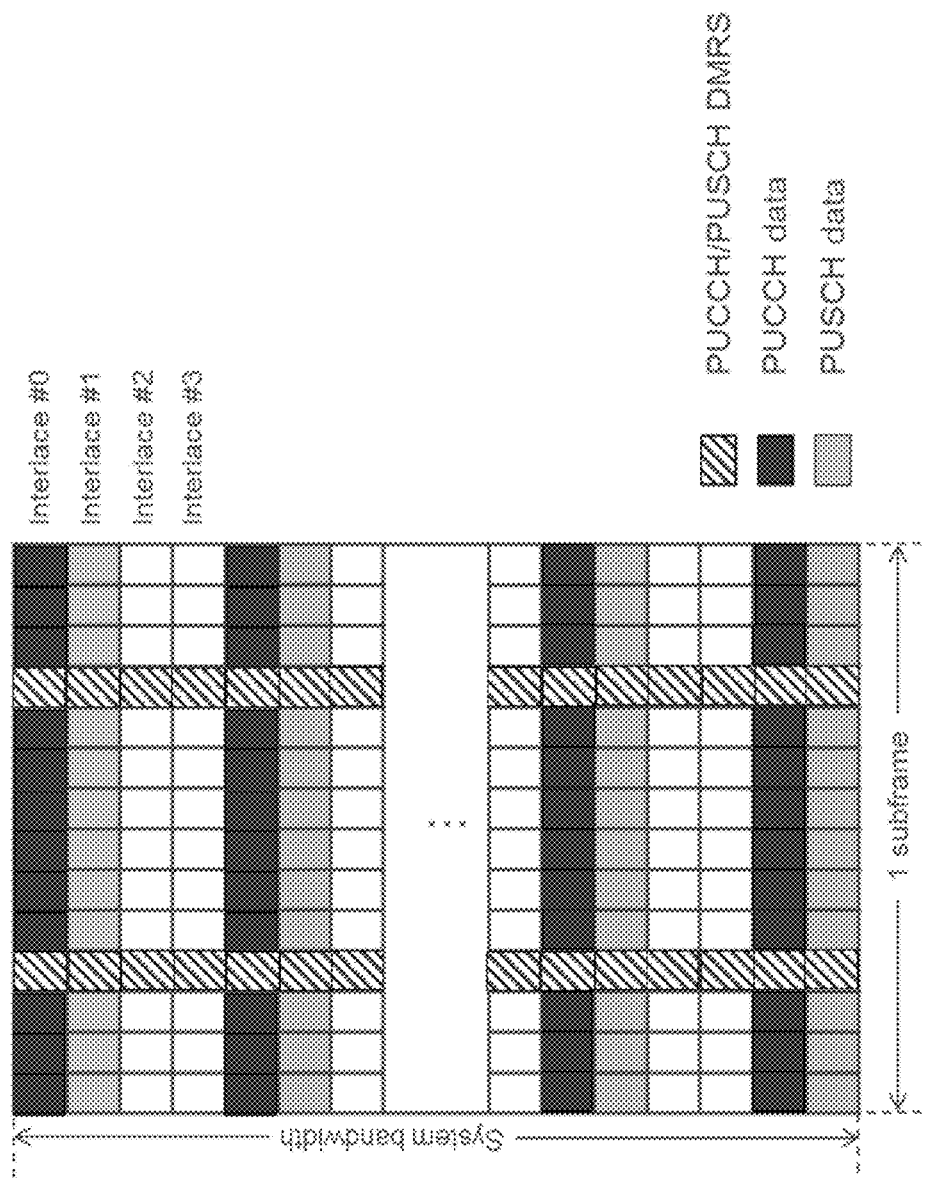
FIG. 8 shows an example of long PUCCH multiplexing with PUSCH transmission in the same subframe
Figure 9:
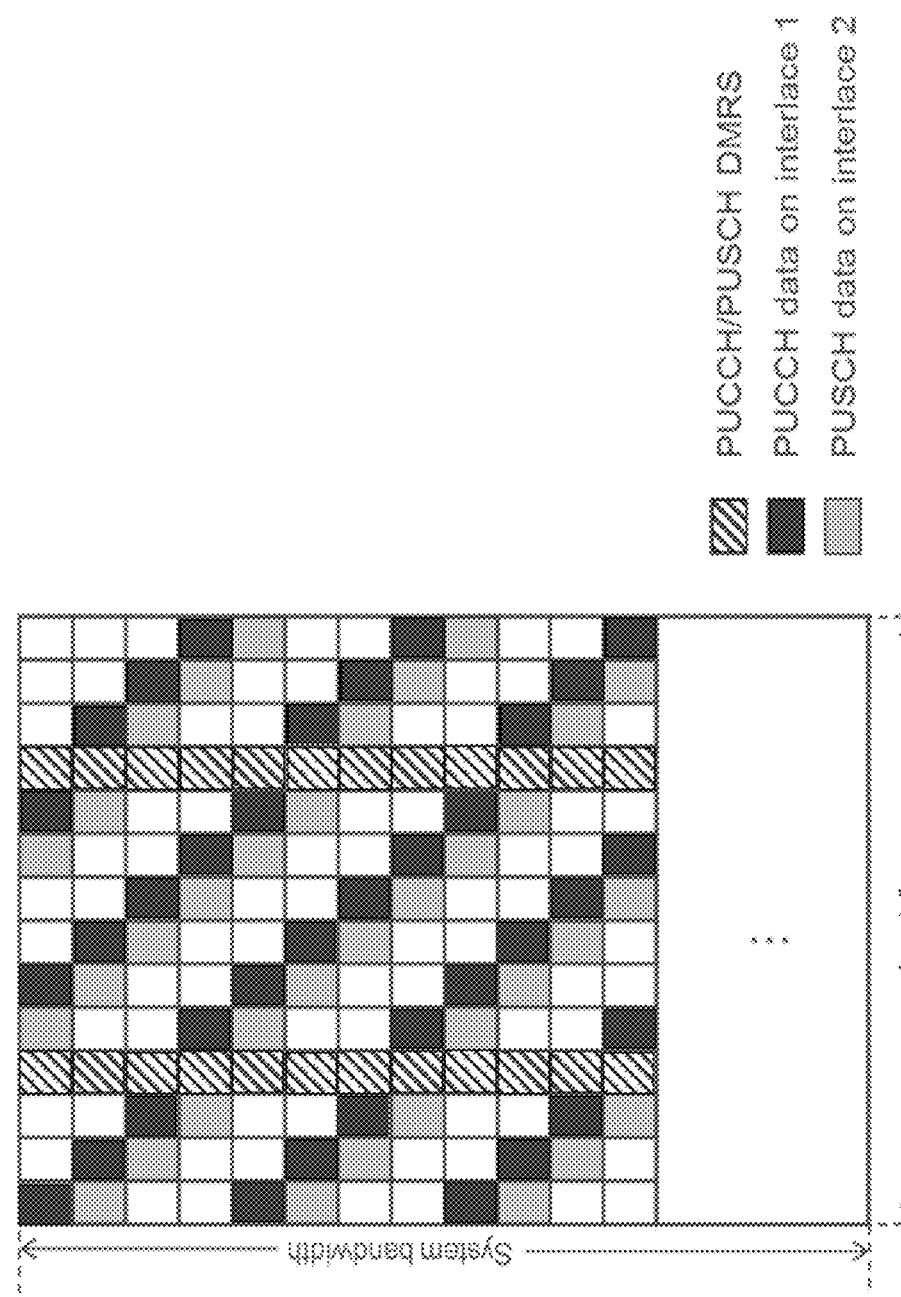
FIG. 9 shows an example of long PUCCH multiplexing with PUSCH transmission in the same subframe with symbol-based frequency hopping.

Similar to short PUCCH, multiple PUCCH UEs can also be multiplexed using long PUCCH. PUCCH UEs can also be multiplexed with PUSCH UEs in the same subframe using different interlacing patterns for PUCCH data and PUSCH data transmissions as shown in FIG. 8 without frequency hopping. In another example, frequency hopping is enabled and UEs are multiplexed by using the hopped resources. One example is to have symbol-based frequency hopping as shown in FIG. 9 (where the interlace numbering refers to the location used at the first symbol in the subframe).

For PUCCH multiplexing, in one example, PUCCH UEs are assigned different interlacing patterns compared to PUSCH UEs and other PUCCH UEs.

In another example, multiple PUCCH UEs are assigned the same interlacing pattern. For data symbols (DS), UEs apply different Orthogonal Cover Codes (OCC) to be multiplexed on the same time-frequency resources. As one example, OCC spreading is applied within a B-IFDMA symbol before the transmitter DFT/IFFT for the total number of allocated subcarriers as shown in FIG. 6, or per PRB-basis by essentially assuming $N_{PRB}=1$ for each PRB within the allocated interlace(s), as previously explained In case there is a B-IFDMA, OCC is applied before DFT. As another example, OCC spreading is applied between B-IFDMA symbols which contain DS.

The reference symbols (RS or so called DMRS) use existing DMRS sequences in LTE uplink based on Zadoff-Chu sequence (assuming >2 PRBs). Multiple UEs use the same root sequence and transmit RS on the same time-frequency resources. For RS multiplexing, in one example, the multiple PUCCH and PUSCH UEs apply different cyclic shifts within one RS symbol.

Figure 10:
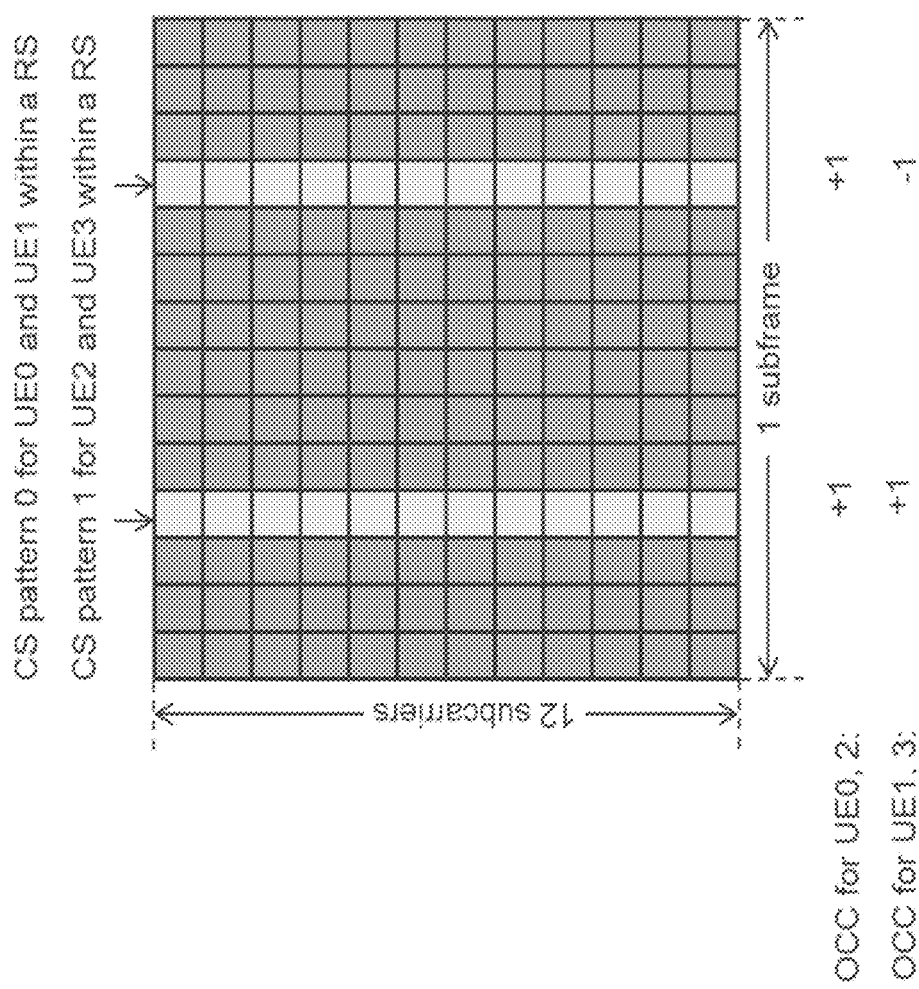
FIG. 10 shows an example of two PUCCH UEs RS multiplexing on the same interlace(s).

In another example, two UEs are multiplexed using OCC [1 1] and [1 −1] on the two DMRS symbols. In a further example, multiple UEs apply both OCC between DMRS symbols and cyclic shifts within one DMRS symbol as shown in FIG. 10. More specifically, the PUSCH UEs can apply OCC [1 1] for the DMRSs while the PUCCH UEs apply OCC [1 −1]. In this way, the total number of DMRS CS (i.e., resources) can be split among all PUCCH UEs independently of the number of PUSCH UEs, and vice versa.

The described embodiments may be implemented in any appropriate type of communication system supporting any suitable communication standards and using any suitable components. As one example, certain embodiments may be implemented in an LTE network, such as that illustrated in FIG. 11.

Figure 11:
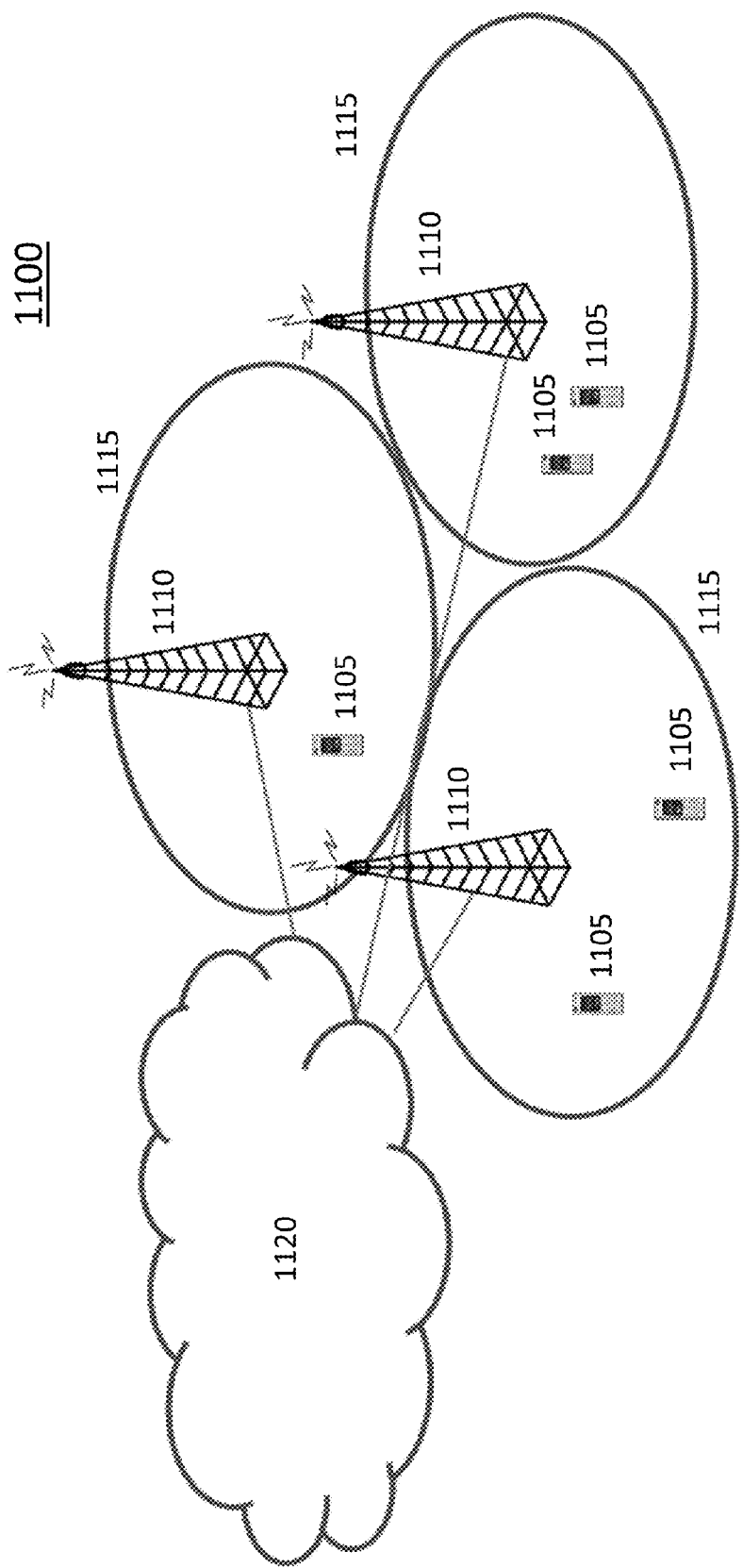
FIG. 11 shows an example of an LTE network.

Referring to FIG. 11, a communication network 1100 comprises a plurality of wireless communication devices 1105 (e.g., conventional UEs, machine type communication [MTC]/machine-to-machine [M2M] UEs) and a plurality of radio access nodes 1110 (e.g., eNodeBs or other base stations). Communication network 1100 is organized into cells 1115, which are connected to a core network 120 via corresponding to radio access nodes 1110. Radio access nodes 1110 are capable of communicating with wireless communication devices 1105 along with any additional elements suitable to support communication between wireless communication devices or between a wireless communication device and another communication device (such as a landline telephone).

Figure 12:
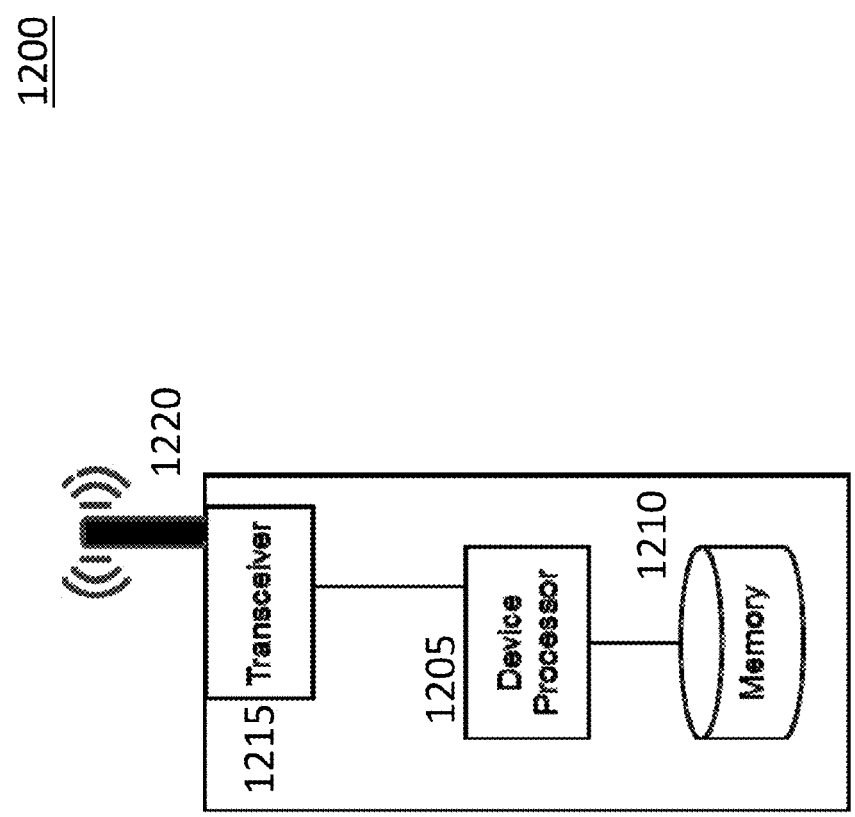
FIG. 12 shows an example of a wireless communication device.

Although wireless communication devices 1105 may represent communication devices that include any suitable combination of hardware and/or software, these wireless communication devices may, in certain embodiments, represent devices such as an example wireless communication device illustrated in greater detail by FIG. 12. Similarly, although the illustrated radio access node may represent network nodes that include any suitable combination of hardware and/or software, these nodes may, in particular embodiments, represent devices such as the example radio access node illustrated in greater detail by FIG. 13.

Referring to FIG. 12, a wireless communication device 1200 comprises a processor 1205, a memory, a transceiver 1215, and an antenna 1220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 12. Alternative embodiments may include additional components beyond those shown in FIG. 12 that may be responsible for providing certain aspects of the device's functionality, including any of the functionality described herein.

Figure 13:
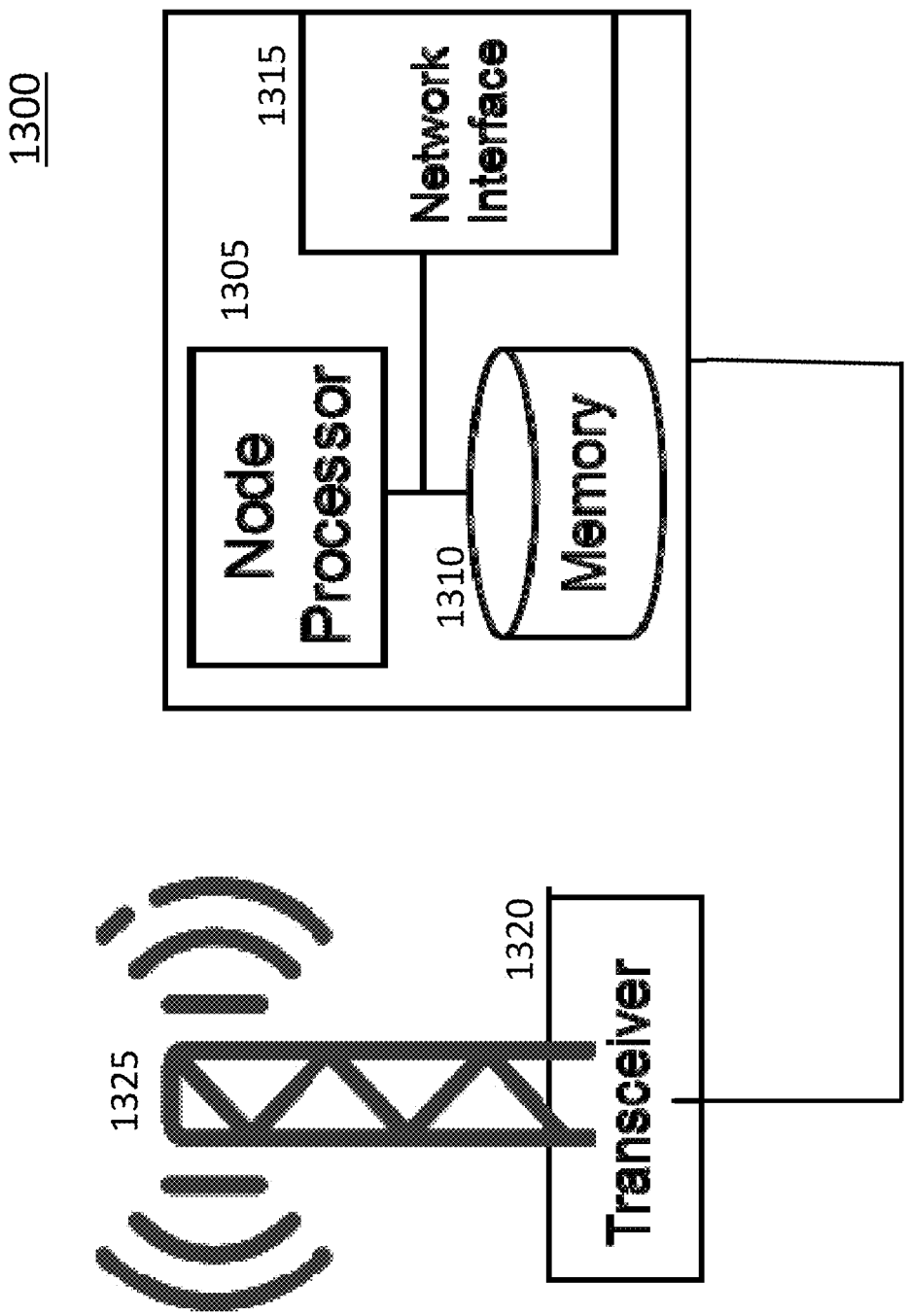
FIG. 13 shows an example of a radio access node.

Referring to FIG. 13, a radio access node 1300 comprises a node processor 1305, a memory 1310, a network interface 1315, a transceiver 1320, and an antenna 1325. In certain embodiments, some or all of the functionality described as being provided by a base station, a node B, an enodeB, and/or any other type of network node may be provided by node processor 1305 executing instructions stored on a computer-readable medium, such as memory 1310 shown in FIG. 13. Alternative embodiments of radio access node 1300 may comprise additional components to provide additional functionality, such as the functionality described herein and/or related supporting functionality.

Figure 14:
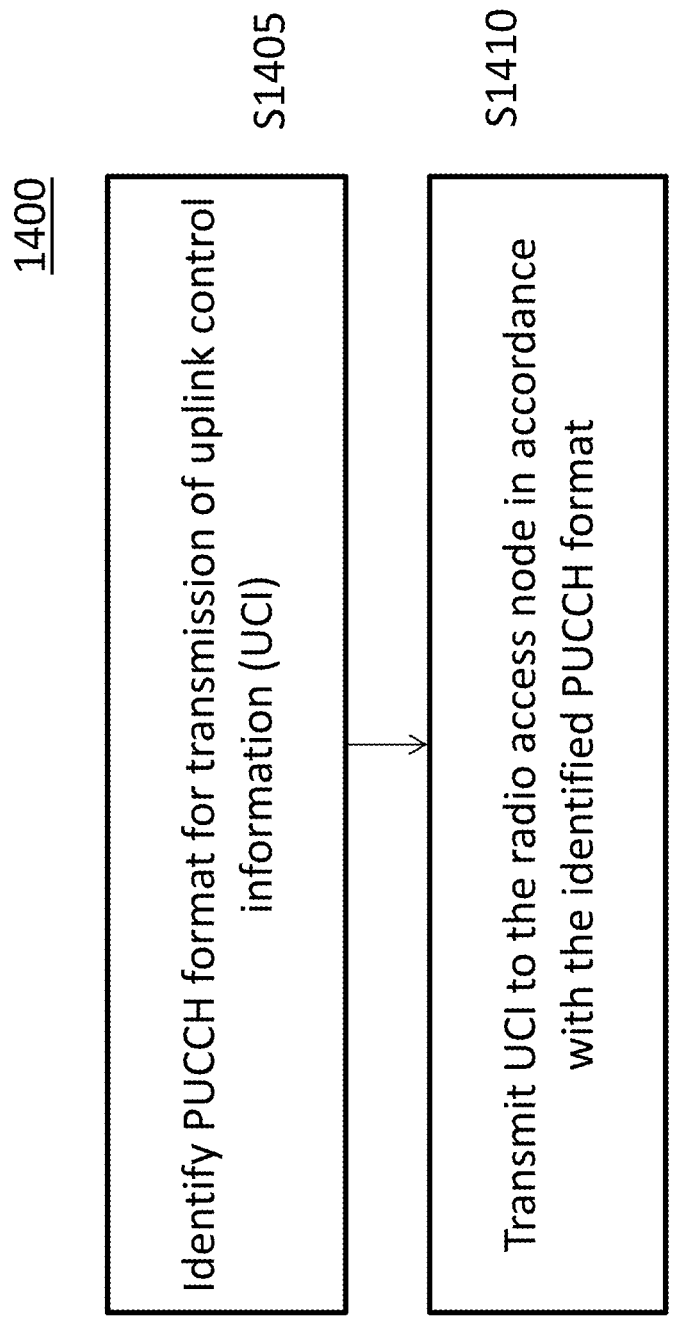
FIG. 14 shows an example method of operating a wireless communication device.
Figure 15:
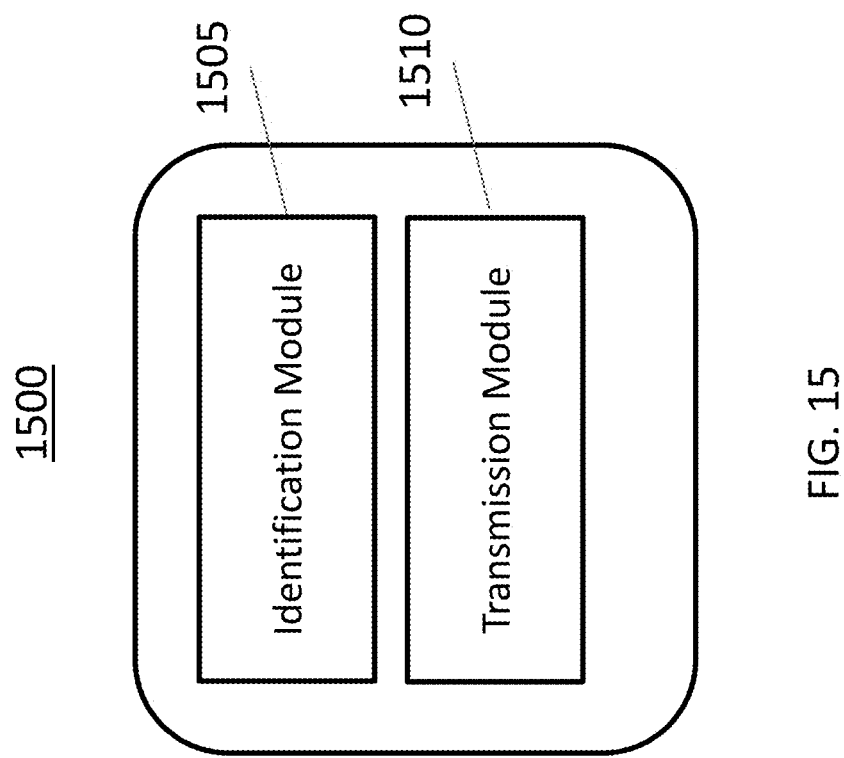
FIG. 15 shows an example of a wireless communication device.
Figure 16:
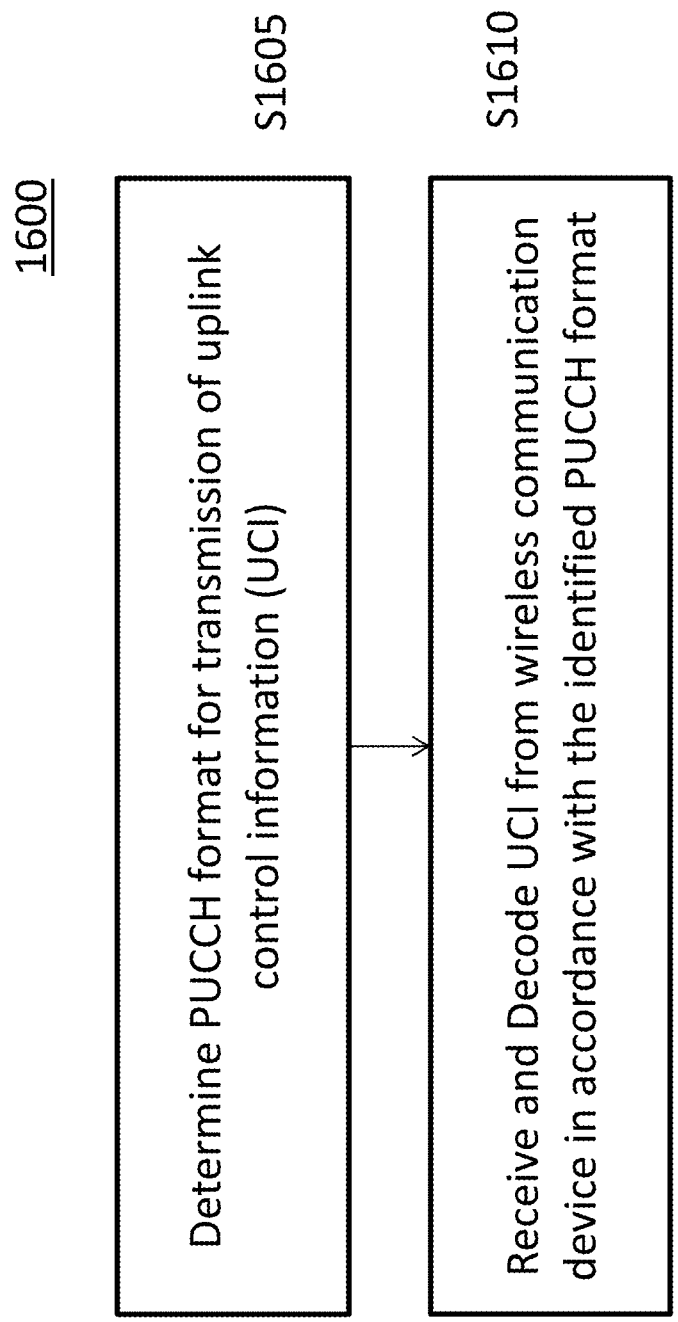
FIG. 16 shows an example method of operating a radio access node.

FIGS. 14-16 illustrate various methods and apparatuses in which some or all of the above features may potentially be implemented.

FIG. 14 is a flowchart illustrating a method 1400 of operating a wireless communication device. The method of FIG. 14 could be performed by a wireless communication device as illustrated in any of FIG. 11, 12 or 15, for instance.

Referring to FIG. 14, method 1400 comprises identifying a physical uplink control channel (PUCCH) format for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level (S1405), and transmitting the UCI to a radio access node in accordance with the identified PUCCH format (S1410). In this and other embodiments, "identifying" or "determining" a PUCCH format may be performed in various alternative ways, such as determining the format based on information available to the wireless communication device, reading an indication of the format from a memory in the wireless communication device, being preconfigured to use the format, receiving signaling from a radio access node that identifies the format, and so on.

In certain embodiments, the UCI is transmitted to the radio access node in coordination with one or more other wireless communication devices. In certain related embodiments, transmitting the UCI in coordination with the one or more other wireless communication devices comprises multiplexing with the one or more other wireless communication devices using orthogonal cover codes (OCC) and cyclic shifts (CS) on control-data symbols and reference symbols, respectively, in the short PUCCH or long PUCCH. In certain other related embodiments, transmitting the UCI to the radio access node in coordination with the one or more other wireless communication devices comprises multiplexing the one or more other wireless communication devices on the same interlace as the short PUCCH or the long PUCCH. In certain other related embodiments, the wireless communication device and the one or more other wireless communication devices are assigned different interlacing patterns. In certain other related embodiments, the wireless communication device and the one or more other wireless communication devices are assigned the same interlacing pattern, and they apply different orthogonal cover codes (OCC) to enable PUCCH control-data on the same time-frequency resources.

In certain embodiments, the PUCCH format is short PUCCH and the short PUCCH comprises at least one demodulation reference signal (DMRS) symbol and at least one control-data symbol in the time domain. In certain related embodiments, the short PUCCH comprises a sequence of symbols at the end of a downlink partial subframe.

In certain embodiments, the PUCCH format is short PUCCH and the transmitting comprises transmitting a demodulation reference signal (DMRS) symbol on all subcarriers within a block-interleaved frequency division multiple access (B-IFDMA) symbol on an assigned interlace or on all assigned interlaces across the entire system bandwidth.

In certain embodiments, the PUCCH format is short PUCCH and the transmitting comprises transmitting a demodulation reference signal (DMRS) symbol once per "n" subcarriers with a pattern that can be shifted or unshifted on different B-IFDMA symbols, where "n" is an integer greater than 1.

FIG. 15 is a diagram illustrating a wireless communication device 1500.

Referring to FIG. 15, wireless communication device 1500 comprises an identification module 1505 configured to identify a PUCCH format as in S1405, and a transmission module 1510 configured to transmit the UCI as in S1410. Wireless communication device 1500 may further comprise additional modules configured to perform additional functions as described above in relation to FIG. 14, for instance.

As used herein, the term "module" denotes any suitable combination of hardware and/or software configured to perform a designated function. For instance, the modules in FIG. 15 and other figures may be implemented by at least one processor and memory, one or more controllers, etc.

FIG. 16 is a flowchart illustrating a method 1600 of operating a radio access node. The method of FIG. 16 could be performed by a radio access node as illustrated in any of FIG. 11, 13 or 17, for instance.

Referring to FIG. 16, method 1600 comprises identifying a physical uplink control channel (PUCCH) format to be used by at least one wireless communication device for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, and wherein the long PUCCH occupies one subframe in the time domain and spans the entire system bandwidth in the frequency domain with interlacing on a resource block level (S1605), and receiving the UCI from the at least one wireless communication device in accordance with the identified PUCCH format (S1610).

In certain embodiments, identifying the PUCCH format comprises selecting between short PUCCH and long PUCCH according to at least one of an eNodeB timing configuration and a hybrid automatic repeat request (HARM) protocol.

In certain embodiments, the received UCI is multiplexed on the same interlace as the short PUCCH or the long PUCCH with information transmitted from at least one other wireless communication device.

In certain embodiments, the PUCCH format is short PUCCH and the short PUCCH comprises at least one demodulation reference signal (DMRS) symbol and at least one control-data symbol in the time domain. In certain related embodiments, the short PUCCH comprises a sequence of symbols at the end of a downlink partial subframe.

In certain embodiments, the received UCI is multiplexed in the short PUCCH or long PUCCH with information transmitted from at least one other wireless communication device. In certain related embodiments, the UCI and the information transmitted from the at least one other wireless communication device are multiplexed using orthogonal cover codes (OCC) and cyclic shifts (CS) on control-data symbols and reference symbols, respectively.

In certain embodiments, the PUCCH format comprises a demodulation reference signal (DMRS) symbol on all subcarriers within a block-interleaved frequency division multiple access (B-IFDMA) symbol on an assigned interlace or on all assigned interlaces across the entire system bandwidth. In certain embodiments, the PUCCH format comprises a demodulation reference signal (DMRS) symbol once per "n" subcarriers with a pattern that can be shifted or unshifted on different B-IFDMA symbols, where "n" is an integer greater than 1.

In certain embodiments, the UCI is multiplexed with UCI from at least one other wireless communication device using different interlacing patterns within the same subframe.

In certain embodiments, the UCI is multiplexed with UCI from at least one other wireless communication device using the same interlacing pattern within the same subframe. In certain related embodiments, the UCI from the at least one wireless communication device and the at least one other wireless communication device are subject to different orthogonal cover codes (OCC).

Figure 17:
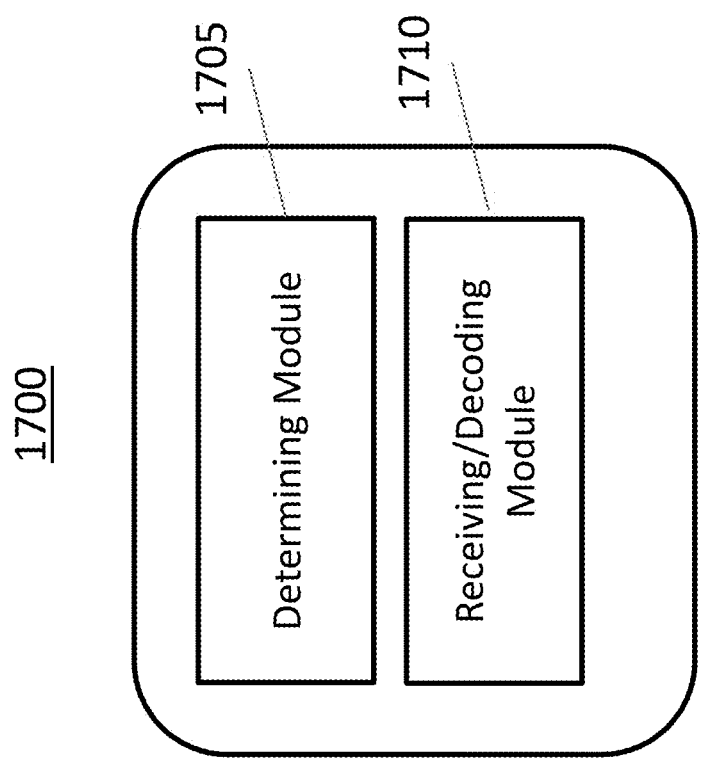
FIG. 17 shows an example of a radio access node.

FIG. 17 is a diagram illustrating a radio access node 1700.

Referring to FIG. 17, radio access node 1700 comprises a determining module 1705 configured to determine or identify a PUCCH format as in S1605, and a receiving/decoding module 1710 configured to receive and decode the UCI as in S1610. Radio access node 1700 may further comprise additional modules configured to perform additional functions as described above in relation to FIG. 16, for instance.

As indicated by the foregoing, certain embodiments of the disclosed subject matter provide two PUCCH formats to be transmitted on carriers in unlicensed spectrum for LAA/Standalone LTE-U. Both formats use interlaced UL resources and can be multiplexed with other PUCCH/PUSCH UEs.

The following abbreviations are used in this description.
CCA Clear Channel Assessment
CRS Cell-Specific Reference Signal
CSI Channel State Information
DCI Downlink Control Information
DL Downlink
DS Data Symbol
eNB evolved NodeB, base station
UE User Equipment
UL Uplink
LAA Licensed-Assisted Access
RS Reference Signal
SCell Secondary Cell
LBT Listen-before-talk
LTE-U LTE in Unlicensed Spectrum
PUSCH Physical Uplink Shared Channel
PUCCH Physical Uplink Control Channel
UCI Uplink Control Information While the disclosed subject matter has been presented above with reference to various embodiments, it will be understood that various changes in form and details may be made to the described embodiments without departing from the overall scope of the disclosed subject matter.

The invention claimed is:

1. A method of operating a wireless communication device, comprising:

identifying a physical uplink control channel (PUCCH) format for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, wherein the short PUCCH comprises a sequence of symbols at the end of a downlink partial subframe, wherein the long PUCCH occupies one subframe in the time domain and spans the entire system bandwidth in the frequency domain with interlacing on a resource block level, and wherein the short PUCCH or long PUCCH comprises at least one demodulation reference signal (DMRS) symbol and at least one control-data symbol in the time domain; and transmitting the UCI to a radio access node in accordance with the identified PUCCH format, wherein the UCI is transmitted to the radio access node in coordination with one or more other wireless communication devices, and wherein transmitting the UCI in coordination with the one or more other wireless communication devices comprises applying orthogonal cover codes (OCC) and cyclic shifts (CS) on control-data symbols and reference symbols, respectively, in the short PUCCH or long PUCCH.

2. The method of claim 1, wherein transmitting the UCI to the radio access node in coordination with the one or more other wireless communication devices comprises multiplexing the one or more other wireless communication devices on the same interlace as the short PUCCH or the long PUCCH.

3. The method of claim 1, wherein the PUCCH format is short PUCCH.

4. The method of claim 1, wherein the PUCCH format is long PUCCH.

5. A wireless communication device, comprising:
at least one processor configured to:
identify a physical uplink control channel (PUCCH) format for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, wherein the short PUCCH comprises a sequence of symbols at the end of a downlink partial subframe, wherein the long PUCCH occupies one subframe in the time domain and spans the entire system bandwidth in the frequency domain with interlacing on a resource block level, and wherein the short PUCCH or long PUCCH comprises at least one demodulation reference signal (DMRS) symbol and at least one control-data symbol in the time domain; and
at least one transmitter configured to transmit the UCI to a radio access node in accordance with the identified PUCCH format, wherein the UCI is transmitted to the radio access node in coordination with one or more other wireless communication devices, and wherein transmitting the UCI in coordination with the one or more other wireless communication devices comprises applying orthogonal cover codes (OCC) and cyclic shifts (CS) on control-data symbols and reference symbols, respectively, in the short PUCCH or long PUCCH.

6. The wireless communication device of claim 5, wherein transmitting the UCI to the radio access node in coordination with the one or more other wireless communication devices comprises multiplexing the one or more other wireless communication devices on the same interlace as the short PUCCH or the long PUCCH.

7. The wireless communication device of claim 5, wherein the PUCCH format is short PUCCH.

8. The wireless communication device of claim 5, wherein the PUCCH format is long PUCCH.

9. A method of operating a radio access node, comprising:
identifying a physical uplink control channel (PUCCH) format to be used by at least one wireless communication device for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, wherein the short PUCCH comprises a sequence of symbols at the end of a downlink partial subframe, wherein the long PUCCH occupies one subframe in the time domain and spans the entire system bandwidth in the frequency domain with interlacing on a resource block level, and wherein the short PUCCH or long PUCCH comprises at least one demodulation reference signal (DMRS) symbol and at least one control-data symbol in the time domain; and
receiving the UCI from the at least one wireless communication device in accordance with the identified PUCCH format, wherein the received UCI is multiplexed in the short PUCCH or long PUCCH with information transmitted from at least one other wireless communication device, and wherein the UCI and the information transmitted from the at least one other wireless communication device are multiplexed using orthogonal cover codes (OCC) and cyclic shifts (CS) on control-data symbols and reference symbols, respectively.

10. The method of claim 9, wherein identifying the PUCCH format comprises selecting between short PUCCH and long PUCCH according to at least one of an eNodeB timing configuration and a hybrid automatic repeat request (HARQ) protocol.

11. The method of claim 9, wherein the received UCI is multiplexed on the same interlace as the short PUCCH or the long PUCCH with information transmitted from at least one other wireless communication device.

12. The method of claim 9, wherein the PUCCH format is short PUCCH.

13. The method of claim 9, wherein the PUCCH format is long PUCCH.

14. A radio access node, comprising:
at least one processor and memory collectively configured to:
identify a physical uplink control channel (PUCCH) format to be used by at least one wireless communication device for transmission of uplink control information (UCI) in unlicensed spectrum, wherein the PUCCH format is short PUCCH or long PUCCH, wherein the short PUCCH occupies less than 1 subframe in the time domain and spans an entire system bandwidth in the frequency domain with interlacing on a resource block level, wherein the short PUCCH comprises a sequence of symbols at the end of a downlink partial subframe, wherein the long PUCCH occupies one subframe in the time domain and spans the entire system bandwidth in the frequency domain with interlacing on a resource block level, and wherein the short PUCCH or long PUCCH comprises at least one demodulation reference signal (DMRS) symbol and at least one control-data symbol in the time domain; and
a receiver configured to receive the UCI from the at least one wireless communication device in accordance with the identified PUCCH format, wherein the received UCI is multiplexed in the short PUCCH or long PUCCH with information transmitted from at least one other wireless communication device, and wherein the UCI and the information transmitted from the at least one other wireless communication device are multiplexed using orthogonal cover codes (OCC) and cyclic shifts (CS) on control-data symbols and reference symbols, respectively.

15. The radio access node of claim 14, wherein identifying the PUCCH format comprises selecting between short PUCCH and long PUCCH according to at least one of an eNodeB timing configuration and a hybrid automatic repeat request (HARQ) protocol.

16. The radio access node of claim 14, wherein the received UCI is multiplexed on the same interlace as the short PUCCH or the long PUCCH with information transmitted from at least one other wireless communication device.

17. The radio access node of claim 14, wherein the PUCCH format is short PUCCH.

18. The radio access node of claim 14, wherein the PUCCH format is long PUCCH.

\* \* \* \* \*

UNITED STATES PATENT AND TRADEMARK OFFICE
CERTIFICATE OF CORRECTION

PATENT NO. : 9,854,569 B2  
APPLICATION NO. : 15/431012  
DATED : December 26, 2017  
INVENTOR(S) : Yang et al.

Page 1 of 1

It is certified that error appears in the above-identified patent and that said Letters Patent is hereby corrected as shown below:

In the Specification

In Column 1, Line 47, delete "(FIG. 1," and insert -- (FIG.) 1, --, therefor.

In Column 4, Line 40, delete "(HARM)" and insert -- (HARQ) --, therefor.

In Column 5, Line 41, delete "(HARM)" and insert -- (HARQ) --, therefor.

In Column 8, Line 42, delete "10M Hz" and insert -- 10MHz --, therefor.

In Column 13, Line 37, delete "(HARM)" and insert -- (HARQ) --, therefor.

Signed and Sealed this
Sixth Day of February, 2018

Joseph Matal
*Performing the Functions and Duties of the
Under Secretary of Commerce for Intellectual Property and
Director of the United States Patent and Trademark Office*